Jan. 29, 1957 R. SCOTT 2,779,826

INDEXING AND SELECTOR DEVICE FOR MAGNETIC TAPE RECORDERS

Filed Aug. 31, 1953

INVENTOR.
Raymond Scott
BY
R. Stephen Baker
ATTORNEY 2,779,826

INDEXING AND SELECTOR DEVICE FOR MAGNETIC TAPE RECORDERS

Raymond Scott, Babylon, N. Y.

Application August 31, 1953, Serial No. 377,606

3 Claims. (Cl. 179—100.2)

Figures 1, 2:
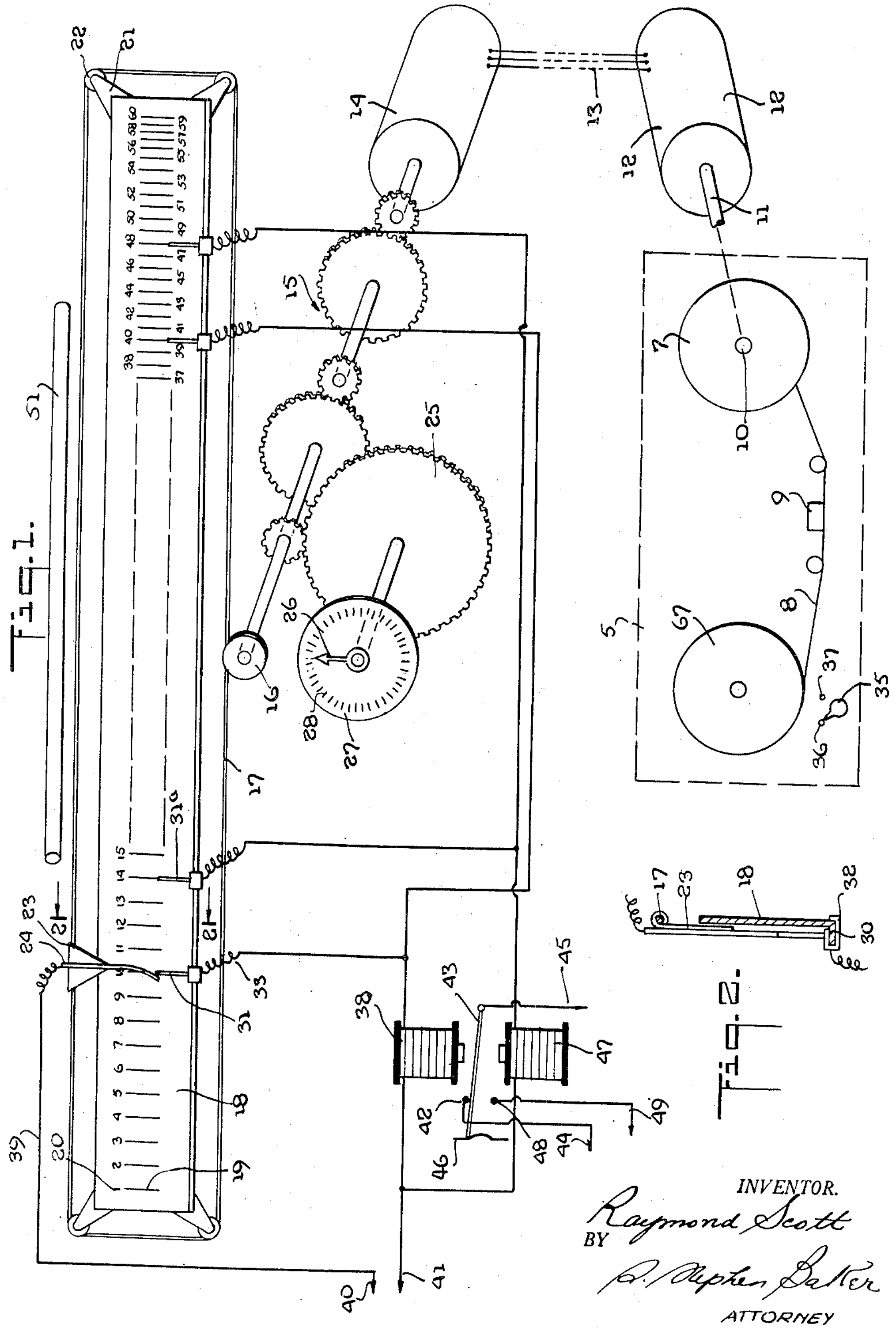

This invention relates to a magnetic tape indexing and selector device to be used in conjunction with a magnetic tape recorder.

In one aspect of the invention, I provide a magnetic tape indicator which may be disposed adjacent to either the keyboard or the music rack of a conventional piano. The reason therefor is that a pianist, composer or other musician may note the position of the indicator while he is composing or the like so that he can correlate such action with the magnetic tape position. In such an arrangement, I have determined that the indicating scale or the like is preferably in rectilinear form so that the user is instantly aware of the relative position of any selection on the entire reel of tape. In other words, since the scale or the like is rectilinear, being in extended elongated form and completely exposed and visible to the user, he notes how much time he has on any particular reel at any point.

In connection with the above, I have provided a remote indicating device wherein an indicator travels along a rectilinear scale as the reel of tape unwinds. Indicia on the scale indicates the extent of such unwinding. According to my invention, such indicia comprises a series of spaced marks which gradually decrease their relative spacing as the load reel becomes unwound. In this way, the space between successive scale graduations is an accurate indication of time since a revolution of the load reel when it is fully loaded unwinds more tape than a revolution when it is near its end. Of course, the take-up reel acts in the reverse manner.

In combination with the above, I further provide movable selector pins which co-act electrically with the indicator for actuating the recording mechanism in a predetermined fashion. Thus, by pre-setting the selector pins in relation to the indicia, I cause an indicator pointer to effect electrical contact therewith at precise times so as to bring about certain electrical actions as will hereinafter be described.

The invention will further be understood from the following description and drawings in which:

Figure 1 is a diagrammatic view of an indicating and selecting system constructed according to my instant invention; and Figure 2 is a cross-sectional view as taken along the lines 2—2 of Figure 1.

The device of the instant invention is used in conjunction with a tape recorder 5 having a load reel 6 and a take-up reel 7. The tape 8 is recorded upon a reproduces sounds in conjunction with recording and playback head 9 in a conventional manner. Motor means are employed to drive the reel 7 through the shaft 10 as will be understood and the tape 8 is drawn off the load reel 6.

The shaft 11 of a self-synchronous or so-called selsyn motor 12 is connected to the shaft 10 and the wires 13 carry the required electrical signals for causing the remote selsyn motor 14 to follow the mechanical action of shaft 11. A train of reducing gears 15 produces a relatively slow rotating movement of wheel or pulley 16 which drives cable 17. As an example, cable 17 may be wound around the grooved periphery of wheel 16 so that as wheel 16 is rotated, the cable 17 is caused to travel as hereinafter described.

The indicating scale 18 is of rectilinear form which may be extended over a length of two or three feet, if desired. It may be fabricated of any suitable material such as plastic or wood and is provided with indicia or lines 19 which are identified by numbers 20. The lines 19 have a greater relative spacing at one end of dial 18 than at the other end where they become crowded together. When the takeup reel begins its operation, the more widely spaced lines are employed as will be shown hereinafter.

Secured to the four corners of scale 18 are wings 21 which rotatably support grooved pulleys or rollers 22. Cable 17 rides in these rollers so that it is uniformly circumferentially spaced from the edges of scale 18. Secured to cable 17 is a triangular plate 23 which carries a flexible, metallic pointer 24. It will be recognized, therefore, that as the cable 17 revolves around the scale 18, the indicating plate 23 and the pointer 24 travel across the scale and the indicia thereof.

In the embodiment illustrated, the lines 19 are numbered 1 to 60. Such indicia is conveniently used for a reel of tape that unwinds in one hour since each line may indicate one minute. Inasmuch as it is also desirable to provide indications of less than one minute divisions, a gear 25 is driven from the train of gears 15 and such gear drives a pointer 26 which rotates once per minute. A dial or scale 27 having second markings 28 is provided so that the pointer 26 further subdivides each scale spacing into sixty divisions.

The device of the instant invention further provides means for automatically playing preselected recordings. Thus, scale 18 is formed with a flange 30 as illustrated in Figure 2 and a series of selector pins or contacts 31 are slidably maintained on the flange 30. Both ends of the flange are open so that the pins 31 may be conveniently applied or removed therefrom. Pins 31 are formed with a substantially U-shaped base 32 which slidably embraces the flange 30. The pins are formed of an electrical conducting material. Secured to base 32 are wires 33.

Pins 31 may be used to institute reproduction of a recorded piece or may stop such reproduction as when the selection is finished. The magnetic tape recorder 5 is of conventional operation and includes a high speed shuttle mechanism with a motor for driving the tape rapidly until a desired point is reached. Of course, such high speed shuttle mechanism is conventionally used for rewinding tape back to the load reel as will be understood.

While high speed shuttle mechanisms are conventional, a typical example thereof is described in the book "Elements of Magnetic Tape Recording" by A. C. Shaney, copyright 1950 by the Amplifier Corp. of America, New York, N. Y. (see page 64 and preceding pages). Similarly, conventional tape recorders include low or playing speed mechanisms with a low speed motor whereby the tape is driven at a relatively slower speed, i. e. anywhere from one and a half to approximately 15" per second. Of course, the different speeds may be achieved through the same motor by conventional regulating means.

In the schematic representation of apparatus 5, the switch 35 may be manually actuated to co-act with the high speed contact 36 or with the low speed or play contact 37. In accordance with the instant invention, however, I employ a solenoid 38 which is adapted to be energized by the wire 33 connected to the pin 31 and by the wire 39, such wires being connected to a suitable power source through terminals 40 and 41. Energization of solenoid 38 starts the low speed motor in order to produce low speed or playing operation independently of the switch 35. Thus, contact 42 is equivalent to the low speed contact 37 and when armature 43 effects contact therewith, the wires 44 and 45 which are connected to the low speed motor through a power source, serve to actuate the motor accordingly. Conventional switch arm locking means are provided to maintain the armature 43 against contact 42 so that the circuit remains closed until the armature is withdrawn therefrom. Such locking means may comprise a leaf spring member 46 having a central projection which holds the armature against either of its contacts.

A solenoid 47 is provided to withdraw armature 43 from contact 42 and to close a second circuit through contact 48. This establishes the high speed operation through wires 45 and 49, the spring 46 maintaining such high speed operation.

The operation of my invention may be understood from the foregoing description but such operation may be briefly summarized as follows:

A loaded reel or tape will be placed into position and the tape will be threaded onto the take-up reel 7. When the tape is being recorded upon, as by a microphone or the like, the pointer 24 travels across the rectilinear scale 18 from one end to the other. This gives the person who is recording the selection a complete, composite view of the recording action. At the same time, he may note the indicia markings which indicate the beginning or ends of compositions or any intermediate portion thereof in which he may be interested. The graduated series of markings enable him to pinpoint a selection with accuracy particularly in conjunction with the second or vernier indicating scale 27. As above stated, the indicating scale 18 may be mounted in parallel relationship with piano keys or across the music rack thereof. Thus, the player may conveniently consult the indexing device while he is playing the piano.

The fully extended, fully exposed, rectilinear scale is also useful in providing a "photographic" indication of the location of a particular selection. Thus, the operator may recall that a desired selection was located at one end or at some other portion of the scale so that he need not consult the index. I further provide an elongated fluorescent light 51 which extends parallel to the scale and illuminates it for the player's convenience.

It may be noted that when the load reel is fully unwound, any conventional means (presumably the high speed shuttle mechanism) may be employed to rewind the tape thereon and such means wil automatically return the pointer 24 to its original position.

In employing the device of the instant invention as a selector, the pins 31 are set into place before the recorder action is commenced. The first pin 31 which is connected to the low speed solenoid 38 determines the playing of the first number while the second pin which I designate 31*a*, discontinues such slow speed operation and restores the recorder to high speed operation. For convenience, the pins 31 may be colored green, for example, while pins 31*a* may be colored red, the green pins being connected to the slow speed solenoid while the red pins are connected to the high speed solenoid. Assuming, for example, that the operator desires to play a recording which occurs between the tenth and the fourteenth lines, he will slide pin 31 up to the line 10 and will slide pin 31*a* up to the line 14. With the indicator pointer 24 at the zero position, the recorder 5 is initially set in high speed operation and the indicator rapidly travels up to the line 10. It thereupon effects contact with selector pin 31 which commences the playing of the desired selection and this continues for four minutes or until the indicator pin 24 contacts selector pin 31*a*. At this time, high speed operation is restored.

Let us further assume that the next desired selection is between lines 40 and 48 and has been preselected. The indicator will thereupon rapidly travel to line 40 and, by the same action as above described, the second selection will be played. It will be evident that any number of selections may be thus played.

What is claimed is:

1. For use with a magnetic tape recorder having electrical mechanism for driving reels of tape at a high, shuttle speed, and at a low, playing speed, an indexing selector device, said device comprising a rectilinear scale having constantly exposed and visible indicia lines from one end of the scale to the other, an indicator pointer mounted for travel across the scale, means to actuate said indicator pointer from one end of the scale to the other, said actuating means being driven by the tape driving mechanism of said recorder, first and second sets of selector pins slidably mounted on said scale and positioned to be contacted by said indicator pointer as it travels across the scale, and electrical circuit means which is closed by the contact of said indicator pointer and said selector pins for operating said tape driving mechanism, said first set of selector pins controlling the low speed mechanism of said tape recorder through said electrical circuit means and said second set of selector pins controlling the high speed or shuttle mechanism thereof through said electrical circuit means.

2. The combination with a magnetic tape recorder having electrical mechanism for driving reels of tape at a high, shuttle speed, and at a low, playing speed, of an indexing selector device, said device comprising a rectilinear scale having constantly exposed and visible indicia lines from one end of the scale to the other, an indicator pointer mounted for travel across the scale, means to actuate said indicator pointer from one end of the scale to the other, said actuating means being driven by the tape driving mechanism of said recorder, first and second sets of selector pins slidably mounted on said scale and positioned to be contacted by said indicator pointer as it travels across the scale, and electrical circuit means which is closed by the contact of said indicator pointer and said selector pins for operating said tape driving mechanism, said first set of selector pins controlling the low speed mechanism of said tape recorder through said electrical circuit means and said second set of selector pins controlling the high speed or shuttle mechanism thereof through said electrical circuit means.

3. The combination according to claim 2 wherein said means to actuate said indicator pointer comprises a self-synchronous motor mechanism, one end of said motor mechanism being connected to said indicator pointer and the other end to said tape driving mechanism.

References Cited in the file of this patent

UNITED STATES PATENTS

| | | |
|---|---|---|
| 1,971,028 | Bothe | Aug. 21, 1934 |
| 2,293,730 | Guttmann | Aug. 25, 1942 |